United States Patent [19]

Koike

[11] Patent Number: 4,555,710

[45] Date of Patent: Nov. 26, 1985

[54] CHARGE-CONTROLLED INK-JET PRINTING METHOD AND APPARATUS

[75] Inventor: Takahisa Koike, Tokyo, Japan

[73] Assignee: Ricoh Company, Ltd., Japan

[21] Appl. No.: 451,193

[22] Filed: Dec. 20, 1982

[30] Foreign Application Priority Data

Dec. 20, 1981 [JP] Japan ................................ 56-205728

[51] Int. Cl.⁴ ........................ G01D 9/00; G01D 15/18

[52] U.S. Cl. ........................................ 346/1.1; 346/75; 346/140 R

[58] Field of Search ................. 346/75, 140 R, 140 IJ, 346/1.1

[56] References Cited

U.S. PATENT DOCUMENTS 3,512,173 12/1967 Damouth ............................. 346/75
3,596,275 7/1971 Sweet .................................... 346/75
3,828,354 8/1974 Hilton .................................. 346/75
4,016,571 4/1977 Yamada ................................ 346/75
4,354,195 10/1982 Oomori ................................ 346/75

*Primary Examiner*—E. A. Goldberg
*Assistant Examiner*—M. Reinhart
*Attorney, Agent, or Firm*—Guy W. Shoup

[57] ABSTRACT

The present ink-jet printer produces ink droplets successively ejected toward a recording medium wherein those ink droplets to be used for printing are charged and deflected through an electric field to be deposited on the recording medium and those ink droplets not to be used for printing are usually not charged and collected in a gutter. However, the last ink droplet of a first series of ink droplets not to be used for printing is charged by a small amount when followed by a second series of ink droplets to be used for printing thereby preventing the first ink droplet of the second series from catching up with the last ink droplet of the first series.

4 Claims, 4 Drawing Figures

CHARGE-CONTROLLED INK-JET PRINTING METHOD AND APPARATUS

BACKGROUND OF THE INVENTION

1. Field of the Invention

This invention generally relates to a non-impact type printer and in particular to an ink-jet printer which discharges a series of charged ink droplets toward a recording medium through the gap between a pair of deflection plates to which an electric field is applied. More specifically, the present invention relates to a method and system for controlling charging of ink droplets in a charging type ink-jet printer.

2. Description of the Prior Art

Several types of ink-jet printers are well-known in the art. The charging type ink-jet printer includes a printing head from which a series of charged ink droplets are discharged toward a recording medium placed against the printing head through the gap between oppositely placed deflection plates to which an electric field is applied. In one type of the ink-jet printer, ink droplets are uniformly charged and passed through the gap between a pair of deflection plates to which an electric field varying in accordance with an image signal is applied. And, in another type of the ink-jet printer, ink droplets are varyingly charged dependent upon an image signal and the thus charged ink droplets are passed through the gap between a pair of deflection plates to which a constant electric field is applied.

In prior art charging type ink-jet printers, ink droplets to be used for printing are charged but those ink droplets which are not used for printing are not charged positively. The noncharged particles are not deflected when they pass through the gap between the deflection plates and thus they are collected by a gutter and prevented from landing on the recording medium as well known in the art. In this case, however, when a series of charged ink droplets are continuously produced by the printer head to fly toward the recording medium, the leading charged ink droplet tends to be pushed forward due to the electrostatic interactions with the following ink droplets which are likely charged. Under the condition, it has been often observed that the first droplet of a series of charged ink droplets to be used for printing catches up with the immediately preceding noncharged ink droplet which is not to be used for printing. This is disadvantageous because print error or distortion will result.

Stated more in detail with reference to FIGS. 1 and 2, the ink droplets indicated by $S_1$–$S_3$ are those which are not positively charged and thus are not to be used for printing; on the other hand, the ink droplets indicated by $K_1$–$K_4$ are those which are positively charged to be used for printing. In this particular case, the ink droplets to be used for printing are charged in the positive polarity. As shown in FIG. 1, in the case where a series of charged ink droplets $K_1$–$K_4$ are preceded by another series of noncharged ink droplets $S_3$–$S_1$, the first droplet $K_1$ of the charged ink droplet series is pushed forward to catch up with the last droplet $S_1$ of the preceding noncharged droplet series thereby forming a larger-sized integrated droplet, as shown in FIG. 2, before being deflected by the electric field formed between the deflection plates. Such merging of ink droplets is not advantageous because the resulting printed characters will be distorted and low in quality.

SUMMARY OF THE INVENTION

In accordance with one aspect of the present invention, there is provided a method for controlling the charging of ink droplets in a charging type ink-jet printer which forms a printed image on a recording medium by passing varyingly charged ink droplets in a first polarity through an electric field to deflect those ink droplets to be used for printing thereby causing those printing ink droplets to reach the recording medium and which includes a gutter for collecting those ink droplets not to be used for printing thereby preventing those nonprinting ink droplets from reaching the recording medium, said method characterized by comprising the step of charging the last ink droplet in a series of a first plurality of said nonprinting ink droplets to a predetermined level in said first polarity as long as the next following series of a second plurality of ink droplets are to be used for printing.

In accordance with another aspect of the present invention, there is provided a system for controlling the charging of ink droplets for use in an ink-jet printer including a printing head which ejects ink droplets successively toward a recording medium, on which a desired image is to be printed, through an electric field after selectively charging said ink droplets and a gutter for collecting those ink droplets which are not to be used for printing, said system comprising: means for supplying a first charging code in accordance with the pattern of an image to be formed on said recording medium; means for supplying a second charging code for charging the last ink droplet of a series of ink droplets not to be used for printing to a predetermined level if the next following series of ink droplets are to be used for printing; switching means for selectively passing either one of said first and second charging codes in response to a selective signal to a digital-to-analog converting means in which said first and second charging codes are converted into analog charging signals which may be used for controlling the charging said ink droplets; and means for supplying said selection signal to said switching means in accordance with the pattern data of an image to be printed.

Therefore it is a primary object of the present invention to provide an improved ink-jet printer free of print distortion.

Another object of the present invention is to provide an ink-jet printer capable of preventing the merging of flying ink droplets from occurring.

A further object of the present invention is to provide a charging control method and system of an ink-jet printer for charging to a predetermined level the last droplet of a series of the ink droplets which are not to be used for printing in accordance with a pattern of the character to be printed.

A still further object of the present invention is to provide an ink-jet printer capable of forming printed characters of excellent quality at all times.

Other objects, advantages and novel features of the present invention will become apparent from the following detailed description of the invention when considered in conjunction with the accompanying drawings.

DESCRIPTION OF THE PREFERRED EMBODIMENTS

As a feature of the present invention, the last ink droplet in a series of nonprinting ink droplets is charged to a predetermined level depending upon the character pattern to be printed on a recording medium. That is, the last ink droplet is charged, if necessary, such that it is still collected by a gutter even if its trajectory is deflected by the electric field formed between a pair of deflection plates. It is not always necessary to charge the last ink droplet of a nonprinting ink droplet series to a predetermined level. The conditions for charging the last ink droplet mainly depend upon the dot pattern of a character to be printed. For example, if a series of a substantial number of nonprinting ink droplets, which are normally not charged, are followed by another series of a substantial number of printing ink droplets, which are normally charged, the last ink droplet of the nonprinting series is charged to a predetermined level under control thereby insuring that the first ink droplet of the printing ink droplet series does not catch up with the last ink droplet of the preceding series. In this case, it is to be noted that all of the ink droplets to be charged are charged in the same polarity. Moreover, even if the last ink droplet of the nonprinting series is charged, the amount of charges is controlled to be low enough for the last ink droplet to be captured by the gutter of the ink-jet printer.

Figure 4:
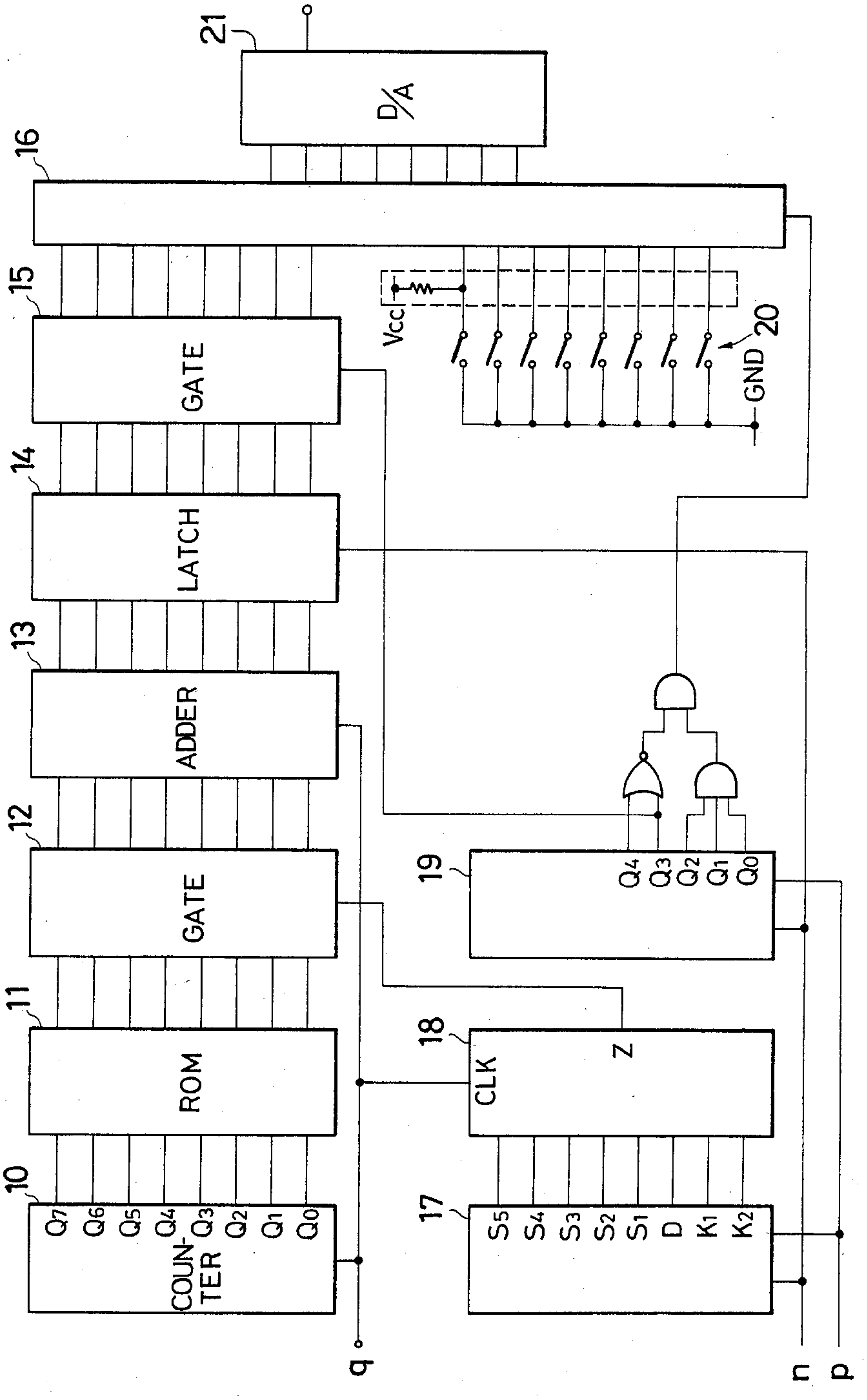
FIG. 4 is a charging control circuit of an ink-jet printer embodying the present invention for controlling the charging of ink droplets in accordance with the pattern of a character to be printed.

Referring now to FIG. 4, the charging control system of the present ink-jet printer includes a counter 10, a read only memory (ROM) 11, a gate circuit 12, an adder circuit 13, a latch circuit 14, another gate circuit 15, a data switching circuit 16, a shift register 17, a multiplexer 18, another shift register 19, a switch array 20 and a digital-to-analog converter 21 which are connected as shown. The circuit receives data p to be printed, an addition pulse signal q and a printing pulse signal n. As is well-known in the art, a table of data for compensating electrostatic effects between charged ink droplets and aerodynamic effects between flying ink droplets is usually stored in the ROM 11, and necessary data for compensation are supplied to a device for charging ink droplets from the D/A converter 21 thereby compensating the amount of charges to be applied to each ink droplet in accordance with the dot pattern of a character to be printed. Such an ordinary process for compensating the electrostatic and aerodynamic interactions between the droplets is well-known in the art and thus it will not be repeated in detail here.

The present invention is not directed to the compensation of electrostatic and/or aerodynamic interactions between arbitrary ink droplets, but it is directed to control the behavior of the leading ink droplet of a series of printing ink droplets, which are charged, by applying a predetermined small amount of charges to the last ink droplet of the immediately preceding series of nonprinting ink droplets. In order to do this, the data switching circuit 16 and the switch array 20 are provided in the control circuit of FIG. 4. Assuming that the data p to be printed requires a series of six nonprinting ink droplets followed by a series of two printing ink droplets which are sufficiently charged and thus deflected to form dots on the recording medium without being collected by the gutter, then, in accordance with the present invention, the first five ink droplets $S_5$–$S_1$ are not charged, but the last ink droplet D of the nonprinting series is to be charged such that it will not be deflected significantly when it flies through the deflecting electric field and that it will exert an electrostatic repulsive force to the following first ink droplet $K_1$ of the printing series of charged ink droplets $K_1$ and $K_2$ thereby preventing the first ink droplet $K_1$ from catching up with the last ink droplet D of the preceding series. Fig. 4 shows that such a data p to be printed is supplied to the shift register 17.

The data p to be printed is shifted in the shift register 17, during which the data $K_2$–$S_5$ are read out sequentially by the multiplexer 18 in response to the addition pulse signal q so that the before-mentioned distortion compensation data supplied from the ROM 11 are properly controlled by the gate circuit 12. The distortion compensation data are, for example, added eight times at the addition circuit 13 and its result is latched into the latch circuit 14. Such a charging code signal thus compensated is then converted into an analog charging signal by the A/D converter 21. On the other hand, in the case of absence of data to be printed, the gate circuit 15 is turned off in response to a signal supplied from the shift register 19.

Then, the following process is carried out to prevent the occurrence of merging of ink droplets in accordance with the present invention. That is, under the condition that the ink droplet D is currently being formed with the preceding series of ink droplets $S_1$–$S_5$ being not charged and thus not used for printing and with the following series of ink droplets $K_1$–$K_2$ being charged and thus used for printing, a charging code signal for charging the ink droplet D indicated by having selected ones of the switch array 20 turned on is supplied to the D/A converter 21 by the data switching circuit 16. As a result, such a charging code signal is converted into an analog signal which is then supplied to the ink droplet charging device. The charging code for charging the last ink droplet D of the preceding series of nonprinting ink droplets may be determined empirically in advance. Accordingly, the ink droplet D is charged to a predetermined level determined by the code given by the switch array 20. Importantly, the ink droplet D is so charged that it will exert an electrostatic repulsive force to the next following likely charged ink droplet $K_1$ to keep it stay away, but the amount of charges is small enough for the ink droplet D to be captured by the gutter. Consequently, the leading ink droplet $K_1$ of a series of printing ink droplets may be prevented from being pushed forward by the succeeding likely charged ink droplets.

Figure 1:
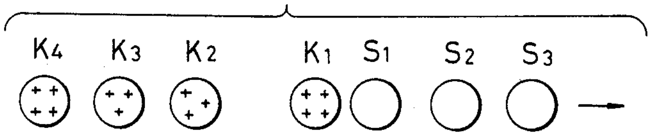
FIG. 1 PRIOR ART
FIGS. 1 and 2 are schematic illustrations showing the flying state of ink droplets in accordance with the prior art ink-jet printer in which a series of nonprinting ink droplets are followed by another series of printing ink droplets.
Figure 2:
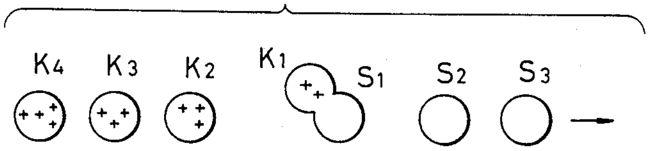
FIG. 2 PRIOR ART
Figure 3:
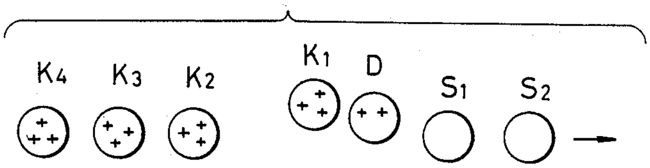
FIG. 3 is a schematic illustration showing the flying state of ink droplets in accordance with the present invention in which a series of nonprinting ink droplets are followed by another series of printing ink droplets.

FIG. 3 shows the flying state of ink droplets which are produced by the present ink-jet printer. As shown, a series of nonprinting ink droplets $S_2$, $S_1$ and D is followed by a series of printing ink droplets $K_1$–$K_4$. The ink droplet D is the last one of the preceding series which is not to be used for printing and, since it is followed by a substantial number of positively charged ink droplets to be used for printing, the ink droplet D is also positively charged by a small amount. Such being the case, the leading ink droplet $K_1$ may be prevented from being pushed forward significantly and it may be located at the balanced position between the two adjacent ink droplets.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for controlling the charging on ink droplets in a charging type ink-jet printer which forms a printed image on a recording medium by passing a first series of varyingly charged ink droplets through an electric field, deflecting ink droplets to be used for printing by causing those printing ink droplets having a first charging state at a print level to reach the recording medium, and collecting with a gutter ink droplets not to be used for printing by preventing those nonprinting ink droplets having a second charging state at a non-print level from reaching the recording medium, said method characterized by a step of charging a last ink droplet of said nonprinting ink droplets having said second charging state at a non-print level to a third charging state at a transitional level, which is different from said non-print level but still sufficient to cause collection by said gutter and is of the same polarity as a next following series of ink droplets having said first charging state at the print level for printing, thereby allowing to prevent a first printing ink droplet of said following series from catching up with said last ink droplet of said non-printing droplets of said first series.

2. A method of claim 1 wherein said electric field is a constant electric field and said ink droplets to be used for printing are charged varyingly in accordance with the pattern of an image to be printed on said recording medium.

3. A system for controlling the charging of ink droplets for use in an ink-jet printer including a printing head which ejects ink droplets successively toward a recording medium, on which a desired image is to be printed, through an electric field after selectively charging said ink droplets to a first charging state at a print level when said ink droplets are to be used for printing and to a second charging state at a non-print level when said ink droplets are not to be used for printing, and a gutter for collecting those ink droplets which are not to be used for printing, said system comprising:

means for supplying a first charging code in accordance with an image pattern to be formed on said recording medium;

means for supplying a second charging code for charging a last ink droplet of a first series of ink droplets having the second charging state at the non-print level to a third charging state at a transitional level which is different from said non-print level but still sufficient to be collected by said gutter and is of the same polarity as a next following series of ink droplets having said first charging state at the print level to be used for printing, thereby allowing to prevent said first ink droplet of said following series from catching up with said last ink droplets of said first series when ejected toward the recording medium;

switching means for selectively passing either one of said first and second charging codes in response to a selective signal to a digital-to-analog converting means in which said first and second charging codes are converted into analog charging signals which may be used for controlling the charging of said ink droplets; and means for supplying said selective signal to said switching means in accordance with the pattern data of an image to be printed.

4. A system of claim 2 wherein said electric field is a constant electric field and said ink droplets to be used for printing are charged varyingly in accordance with the pattern data of an image to be printed on said recording medium.

* * * * *